United States Patent
Knoppers et al.

(10) Patent No.: US 6,882,895 B1
(45) Date of Patent: Apr. 19, 2005

(54) METHOD AND PROGRAM FOR MANUFACTURING A PRODUCT HAVING LOCALLY SPECIFIC PROPERTIES

(75) Inventors: German Enrique Knoppers, Rotterdam (NL); Jeroen van den Hout, The Hague (NL)

(73) Assignee: Nederlandse Organisatie Voor Toegepast-Natuurwetenschappelijk Onderzoek Tno, Delft (NL)

(*) Notice: Subject to any disclaimer, the term of this patent is extended or adjusted under 35 U.S.C. 154(b) by 0 days.

(21) Appl. No.: 10/111,747
(22) PCT Filed: Nov. 1, 2000
(86) PCT No.: PCT/NL00/00786
§ 371 (c)(1), (2), (4) Date: Oct. 7, 2002
(87) PCT Pub. No.: WO01/33510
PCT Pub. Date: May 10, 2001

(30) Foreign Application Priority Data

Nov. 2, 1999 (NL) .............................................. 1013460

(51) Int. Cl.[7] .............................................. G06F 19/00
(52) U.S. Cl. ........................ 700/119; 700/56; 700/117; 700/182; 707/100
(58) Field of Search ................................. 700/180, 182, 700/1, 56, 90, 95, 117–119; 707/100, 103 R, 104.1

(56) References Cited

U.S. PATENT DOCUMENTS

| | | | | |
|---|---|---|---|---|
| 6,021,358 A | * | 2/2000 | Sachs | 700/98 |
| 6,471,800 B1 | * | 10/2002 | Jang et al. | 156/58 |
| 6,532,394 B1 | * | 3/2003 | Earl et al. | 700/119 |
| 6,635,333 B1 | * | 10/2003 | Grigg et al. | 428/134 |

FOREIGN PATENT DOCUMENTS

EP 1 170 115 A2 * 9/2002

* cited by examiner

Primary Examiner—Jayprakash N. Gandhi
(74) Attorney, Agent, or Firm—Norris McLaughlin & Marcus, P.A.

(57) ABSTRACT

A method for manufacturing a product having locally specific properties, the geometric form of which is described by a collection of polygonal basic figures in particular in STL (structural triangulation language), comprises the following steps: selecting the above basic figures a face part composed of coherent basic figures, adding to that face part at least one specific property, which during the manufacture of the product is to be given to the part thereof that comprises the above face part, optionally repeating the above process steps for other face parts to be selected, and manufacturing the product on the basis of the then obtained model information by means of a technique adding material in layers or in a die molding process, which includes giving the associated specific property during the building up in layers of at least the part of the product that comprises the above face part or during the injection molding.

13 Claims, 3 Drawing Sheets

METHOD AND PROGRAM FOR MANUFACTURING A PRODUCT HAVING LOCALLY SPECIFIC PROPERTIES

BACKGROUND OF THE INVENTION

The present invention relates to a method for manufacturing a product having locally specific properties, the geometric form of which is described by a collection of polygonal basic figures, in particular in STL (structural triangulation language).

Such products can be manufactured by building up the product in layers by using all kinds of techniques adding material in layers, known under the designation LMT (layers manufacturing technology) or SFF (solid freedom fabrication), such as, for instance, stereolithography and selective laser sintering. It is also possible to manufacture such products in a die molding process, in which connection the term die is also understood to mean all types of punches and further tools that are necessary for manufacturing specific product forms. When designing and manufacturing such products, CAD/CAM systems are often used. It should be noted that a product built up in layers may also include a die which, in turn, can be used for manufacturing a further product having locally specific properties.

SUMMARY OF THE INVENTION

In order to give in these known techniques the product to be manufactured a greater flexibility in appearance, material composition and/or physical or other properties, the method as described in the opening paragraph comprises according to the invention the following steps: selecting from the above basic figures a face part composed of coherent basic figures, adding to that face part at least one specific property, which during the manufacture of the product is to be given to the part thereof that comprises the above face part, optionally repeating the above process steps for other face parts to be selected, and manufacturing the product on the basis of the then obtained model information by means of a technique adding material in layers or in a die molding process, which includes giving the associated specific property during the building up in layers of at least the part of the product that comprises the above face part or during the injection molding.

The above specific properties can relate to the color to be given to specific face parts, the material composition of specific parts of the product and/or the physical or other properties of specific parts of the product, such as the elasticity, the hardness and the like, or, when the method is used in a die molding process, the designation of the part of the product to be manufactured in a specific die half. When the product is a die, for instance a technique adding material in layers can be used for manufacturing parts of a die half from different materials. In this manner, different parts of the die can be given different properties, such as, for instance, a different heat conductivity, or the die can be locally provided with a wear-resistant layer in one operating cycle.

Moreover, several properties can be assigned to face parts, for instance both a specific material composition and a color. Adding specific properties to a face part means both directly assigning specific properties to the basic figures of the face part and indirectly assigning specific properties to the basic figures of the face part by assigning these properties to the face part, after which they are added to the basic figures which this face part is composed of.

The wall thickness of the face parts which together set up the model is zero, for which reason, after one or more specific properties have been given to one or more selected face parts, the model information then relating to a shell model (having wall thickness zero) will be converted into model information relating to a volumetric model, after which on the basis of the latter information the product is manufactured by means of a technique adding material in layers. Of course, this measure is not applicable in a die molding process. In fact, a CAD model, in which specific properties have been added to the basic figures, remains a CAD model that can be directly supplied to a CAM system.

Selecting face parts can occur by displaying the geometric form of the product on the screen of a monitor belonging to a computer, indicating a polygonal basic figure on the monitor, after which all these basic figures are combined with the indicated basic figure to a face part, the normal vectors of which mutually or relative to the normal vector of the indicated basic figure do not exceed a preset angular difference.

Adding the face parts of specific properties can occur by selecting a code from the specific properties stored in code in the memory of a computer and adding them to file data belonging to the selected face parts. This code can be stored for each of the basic figures in the memory of the computer.

When the basic figures consist of triangles in STL, the code can be stored for each of the triangles in the memory space available in the STL file of each triangle. The standard available memory space is presently two bytes, so that for instance in the memory space available in the STL file of each triangle $2^{15}$ color codes can be stored.

The invention further relates to a computer program used for manufacturing a product having locally specific properties, the geometric form of which is described by a collection of polygonal basic figures, in particular in STL (structural triangulation language), which program comprises the following steps: selecting from the above basic figures a face part composed of coherent basic figures and adding to that face part at least one specific property, which during the manufacture of the product is to be given to the part thereof that comprises the above face part, optionally repeating the above process steps for other face parts to be selected. The program can be used for manufacturing products both by means of a technique adding material in layers and in a die molding process. Specifically when using the former techniques, the program is of such design that, after one or more specific properties have been given to one or more selected face parts, the model information then relating to a shell model is converted into model information relating to a volumetric model, after which on the basis of the latter information the product can be manufactured by means of a technique adding material in layers.

Finally, the invention relates to a computer system used during the manufacture of a product having locally specific properties, the geometric form of which is described by a collection of polygonal basic figures, in particular in STL (structural triangulation language), which computer system uses one of the above systems.

The invention will now be explained in more detail with reference to the accompanying drawing. In this drawing:

DETAILED DESCRIPTION OF THE PRESENTLY PREFERRED EMBODIMENTS

Figure 1:
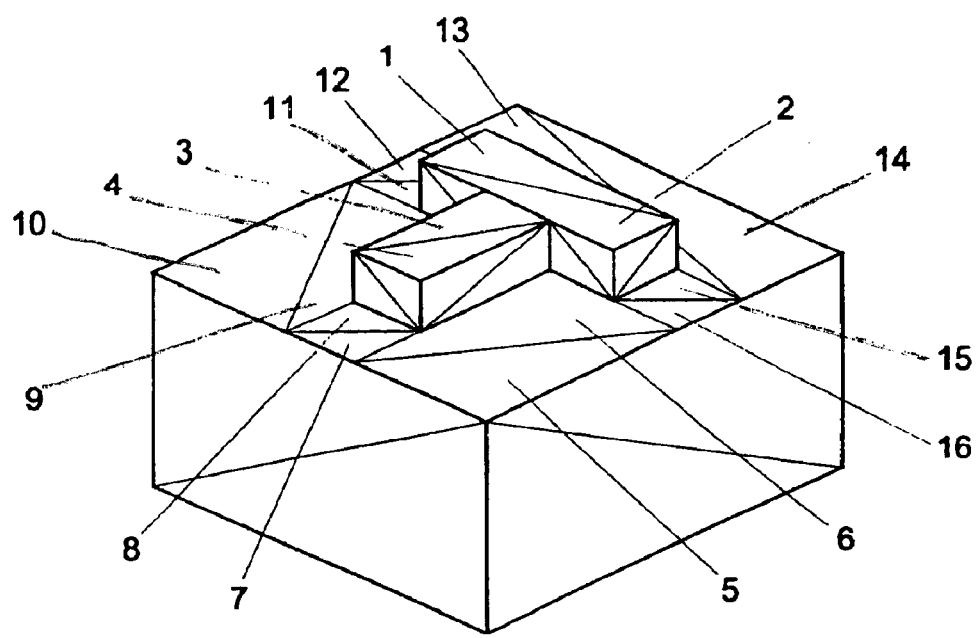
FIG. 1 shows a block-shaped model in STL having in relief thereon a letter T to be designed in another color than the block itself.

Although a geometric form can be described by a collection of polygonal basic figures in general, triangular basic figures will be started from hereinbelow, i.e. basic figures in standard STL (structural triangulation language), such as provided by a CAD system, for instance when using a "rapid prototyping technique". The STL file comprises a collection of triangles, each of which is described by three coordinates and a normal vector. Besides, per triangle two bytes are presently standard available for additional information. In the example described with reference to FIG. 1 this information will consist of a color code. FIG. 1 shows a block-shaped model in STL having in relief thereon a letter T to be designed in another color than the block itself. In order to be able to give each triangle a color code, the object, in this example the block-shaped model of FIG. 1, is displayed three-dimensionally on the screen of a monitor belonging to a computer. Then a triangle, for instance triangle 1, is indicated on the screen with the cursor. This is followed by automatically selecting all the always adjacent triangles that satisfy a preset criterion, that is to say that the angle between the normal vectors, also referred to as tolerance angle, of the always adjacent triangles must be smaller than a predetermined value. If in the example described here this tolerance angle is 60°, then, after indication of triangle 1, the triangles 2, 3 and 4 will be directly selected. By then selecting a desired color from a color code stored in the memory, the relevant code is added to the STL files of the triangles 1–4. Then background triangle 5 is to be indicated in this example, after which, by using the same criterion, the triangles 6–16 will be directly selected. Moreover, a color code can be added to the STL files of this group. After that this process can be repeated until a color code has further been added to the STL files of the triangles in all the vertical faces of the model shown in FIG. 1. In this manner, groups of triangles, that is to say face parts, are obtained, of which, for the relevant triangles, a color code is included in the STL files. Thus, for instance, the block in FIG. 1 can be given the color white, and the letter T provided thereon in relief can be given the color red. If in this example a tolerance angle of, for instance, 100° is selected as criterion for the vertical faces of the letter T and of the block, then, after a triangle has been indicated in a relevant vertical face, all the triangles in all the vertical faces of the letter T or of the block can be selected in one go. This, however, is only possible if the face parts already provided with a color code are excluded.

Figure 2:
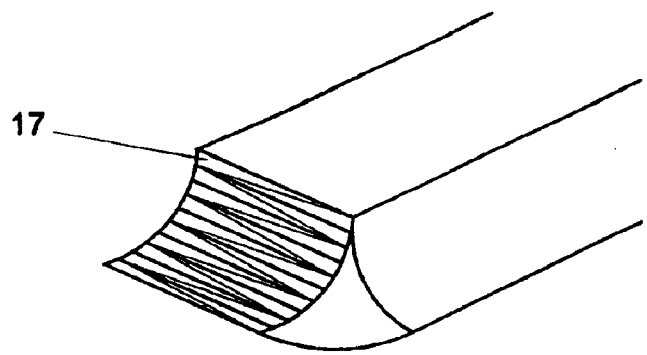
FIG. 2 shows a part of the letter T in FIG. 1, but in which the transition from the top face of the letter to the background is not sharp.
Figure 3:
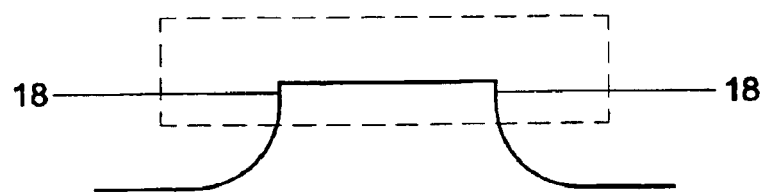
FIG. 3 shows a cross-section of the part of the letter T shown in FIG. 2.

Problems can occur when the transition between two face parts is not sharp enough. This situation is shown in FIGS. 2 and 3. FIG. 2 shows a part of the letter T in FIG. 1, but in which the transition from the top face of the letter to the background is not sharp, while FIG. 3 shows a cross-section of the part of the letter T shown in FIG. 2. In FIG. 2 the triangular structure is only shown in one of the transition faces from the upwardly projecting relief face to the background face. If the tolerance angle between two adjacent triangles is always considered, then, after for instance indicating the upper triangle 17, all the triangles in the relevant transition face will be selected successively. It is also possible, however, to always compare the normal vectors of the relevant triangles with those of the triangle 17, so that, if an angle between the normal vectors of for instance 30° is taken as criterion, only the upper group of triangles is selected. This can be referred to as a relative tolerance angle in the first case and as an absolute tolerance angle in the second case.

Moreover, it is possible to display the cross-section on the screen (FIG. 3) and, by providing a window, to indicate the parts 18 of the relevant transition faces to which a specific color code is to be added.

By adding a color code in the STL files of the model, this is described in CTL (colored triangulation language). A CAD model in CTL can be supplied to a CAM system for designing a die, after which the products can be manufactured by means of a correspondingly realized die by injection molding, in which connection the color in which specific parts of the product are to be molded must be considered. In the example shown in FIG. 1, for instance, the block can be formed in one die half and the letter T in the other die half. By introducing a white plastic of for instance ABS (acrylonitrile-butadiene-styrene copolymer) into the die from one die half and, if this is sufficiently hardened, a red plastic of for instance PC (polycarbonate) from the other die half, a product sprayed in two colors can be obtained. The die, however, must then be designed in an appropriate manner.

In order to be able to manufacture a product in a technique adding material in layers, a model shown in CTL is insufficient. In fact, the wall thickness of the face parts which together set up the model is zero; such a model is further indicated as shell model. This shell model must be converted into a volumetric model.

Figure 4A:
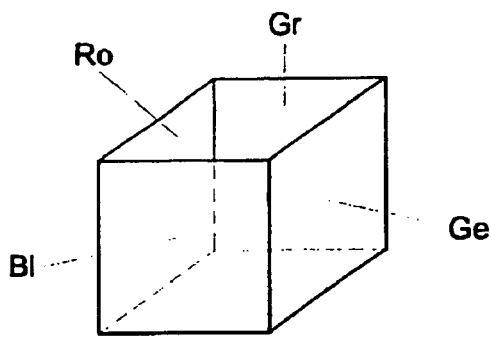
FIGS. 4A–C show succession of a shell model of a cube-shapes object.
Figure 4B:
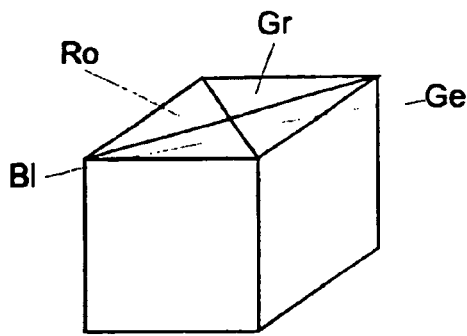
Figure 4C:
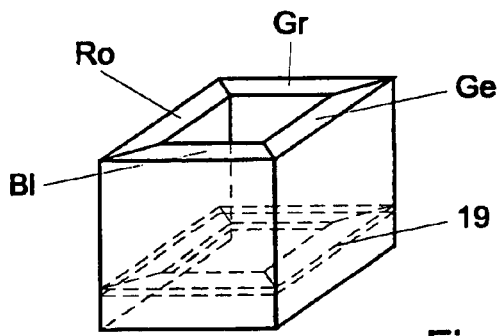

After the face parts to be given a specific color have been selected, a conversion of the shell model built up by the common face parts into a volumetric model must take place. Successively shown in FIGS. 4A–4C are a shell model of a cube-shaped object, a solid element model thereof and a solid element shell model of this object. Assuming the face parts formed by the four upright sides have been given the color codes blue (Bl), red (Re), green (Gr) and yellow (Ye), then the model 4A described in CTL must be converted into a volumetric model, that is to say in either the solid element model 4B or the solid element shell model 4C. In fact, a so-called "slice" can be made from these models 4B and 4C, that is to say a layer having an indicated thickness. The product can then be built up in a manner known for techniques adding material in layers by providing layers 19 on each other (FIG. 4C), while the different parts of each layer are provided in the indicated color.

Figure 5A:
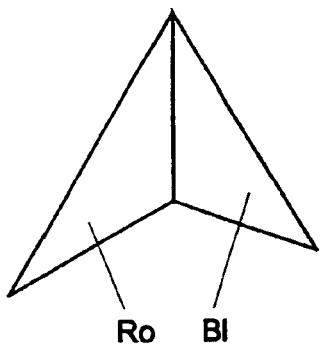
FIGS. 5A–C show triangles in colored triangulation language (CTL)
Figure 5B:
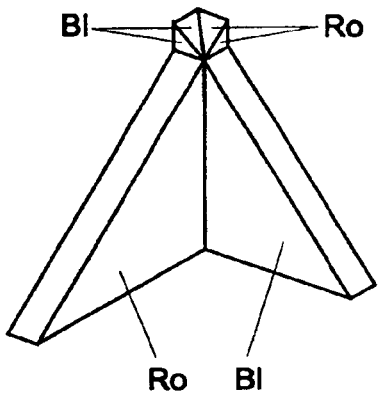
Figure 5C:
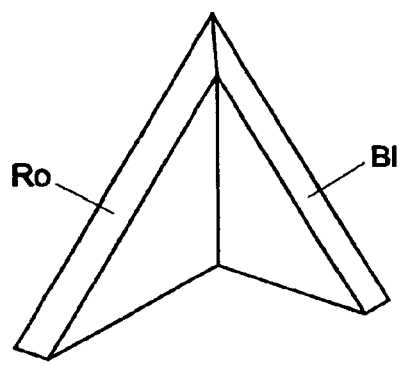
Figure 6:
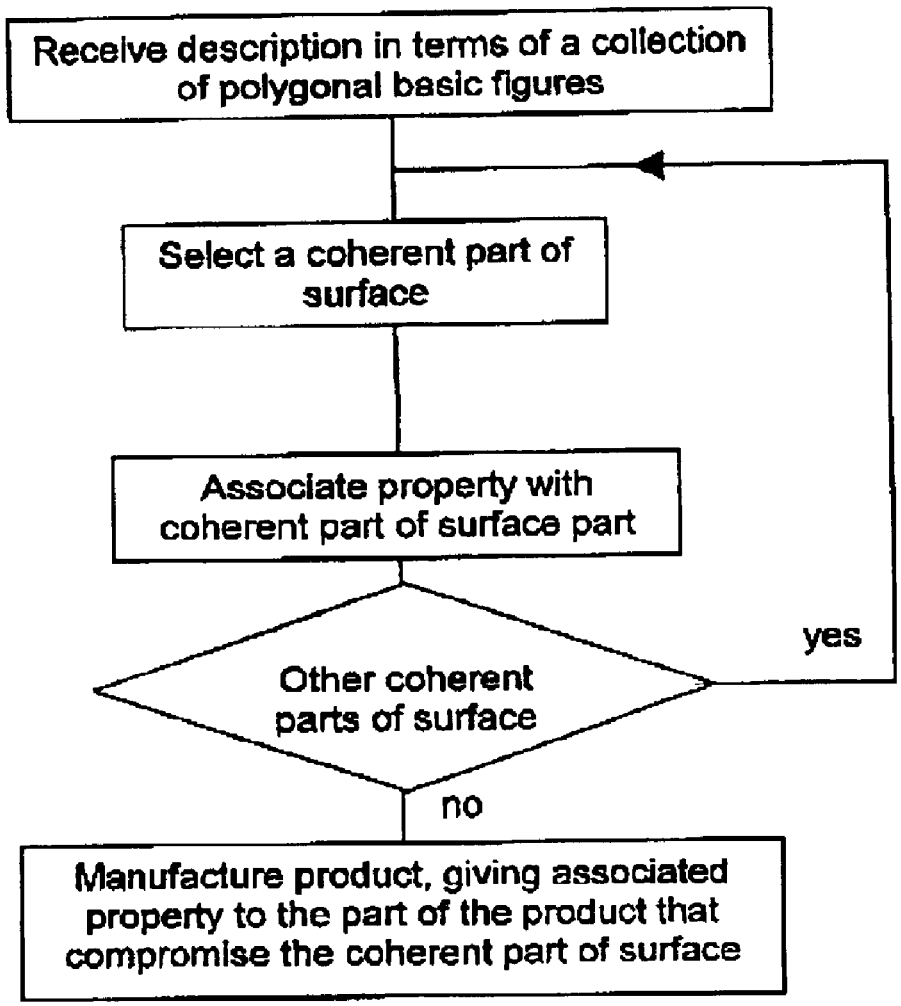
FIG. 6 shows a flow diagram for the method of the present invention.

The method in which a model in STL is converted into CTL, and if required subsequently into a volumetric model, is realized by means of a program appropriate therefor. The algorithm must then be such that the faces to be extruded do not intersect each other. In FIG. 5A three triangles are shown in CTL. If a solid element shell model is made therefrom without anything more, a product as shown in FIG. 5B will be obtained. Corrections in the algorithm must ensure that a model as shown in FIG. 5C is obtained. Of course, other corrections can also be made, if so desired.

The invention is not limited to the exemplary embodiments described herein with reference to the Figures, but comprises all kinds of modifications thereof, of course as far as falling within the scope of protection of the appended claims.

Thus, for instance, it is possible that the codes to be added to the model in STL not only relate to the color of selected face parts, but also to other specific properties or to combinations of specific properties, as already mentioned before. Thus, for instance, the upright red and yellow side faces of the solid element shell model shown in FIG. 4C can be manufactured from a harder plastic than the blue and green upright side faces.

The method described herein is realized by means of computer programs specifically directed to selecting from the basic figures a face part composed of coherent basic figures and adding to that face part at least one specific property, which during the manufacture of the product is to be given to the part thereof that comprises the above face part, and optionally repeating these process steps for other face parts to be selected, or to converting the model information then relating to a shell model into model information relating to a volumetric model.

What is claimed is:

1. A method for manufacturing a product having locally specific properties, the geometric form of which is described by a collection of polygonal basic figures, in particular in STL (structural triangulation language), the method comprises the following steps:

selecting from the collection of polygonal basic figures a subset of basic figures describing a coherent part of a surface of the product, the basic figures in the subset being selected automatically by selecting basic figures that are always adjacent to at least one previously selected basic figure from the surface part, so that the part of the surface defined by the selected basic figures is coherent, after the selecting step, assigning to the subset at least one specific property, which during the manufacture of the product is to be given to the part thereof that comprises said coherent part of the surface, optionally repeating the above process steps for other coherent part of the surface to be selected, and manufacturing the product on the basis of the then obtained model information by means of a technique adding material in layers or in a die molding process, which includes giving the associated specific property during the building up in layers of at least the part of the product that comprises the coherent part of the surface or during the injection molding.

2. The method according to claim 1, wherein, after one or more specific properties have been given to one or more selected coherent parts of the surface, the model information then relating to a shell model is converted into model information relating to a volumetric model, after which on the basis of the latter information the product is manufactured by means of a technique adding material in layers.

3. The method according to claim 1, wherein selecting coherent parts of the surface occurs by displaying the geometric form of the product on a computer monitor, indicating a polygonal basic figure on the monitor, after which all the basic figures are combined with the indicated basic figure to a coherent part of the surface the normal vectors of which mutually or relative to the normal vector of the indicated basic figure do not exceed a present angular difference.

4. The method according to claim 1, wherein adding specific properties to the coherent part of the surface occurs by selecting a code from the specific properties stored in code in the memory of a computer and adding them to file data belonging to the selected face parts.

5. The method according to claim 4, wherein the specific properties art selected from the following properties including the color of a face part, the physical properties of a face part, such as the material composition, and the indication of the part of a product that is to be manufactured in a specific die half.

6. The method according to claim 4, wherein the above code is stored for each of the basic figures in a computer memory.

7. The method according to claim 4, wherein the basic figures include triangles in STL, and wherein the code is stored for each of the triangles the memory space available in the STL file of each triangle.

8. The method according to claim 7, wherein $2^{15}$ color codes are capable of being stored in the memory space available in the STL file of each triangle.

9. A product produced according to the process of claim 1.

10. A product having locally specific properties including a geometric form described by a collection of polygonal basic figures in STL (structural triangulation language) produced by performing the steps of:

selecting from the collection of polygonal basic figures at let one part of a surface composed of coherent basic figures; and adding to the coherent part of the surface at least one specific property, which during the manufacture of the product is to be given to the part thereof that comprises the coherent part of the surface, optionally repeating the above process steps for other coherent parts of the surface to be selected, and manufacturing the product on the basis of the then obtained model information by means of a technique adding material in layers or in a die molding process which includes giving the associated specific property during the building up in layers of at least the part of the product that comprises the coherent part of the surface or during the injection molding.

11. The product according to claim 10, wherein the producing steps further comprise:

after one or more specific properties have been given to one or more selected coherent part of the surface, model information relating to a shell model is converted into model information relating to a volumetric model, after which on the basis of the latter information the product is manufactured by means of a technique adding material in layers.

12. A system for manufacturing a product having locally specific properties including a geometric form described by a collection of polygonal basic figures, in particular in STL (structural triangulation language), the system comprising:

means for selecting from the basic figures a coherent part of the surface composed of coherent basic figures, and adding to the coherent part of the surface at least one specific property, which during the manufacture of the product is to be given to the part thereof that comprises the coherent pant of the surface, and means for optionally repeating the above process steps for other coherent parts of the surface to be selected.

13. The system of claim 12, wherein the means for selecting, after one or more specific properties have been given to one or more selected coherent part of the surface, converts model information relating to a shell model into model information relating to a volumetric model, such that on the basis of the latter information the product is capable of being manufactured by means of a technique adding material in layers.

* * * * *